Dec. 12, 1933.   M. LUTHY   1,939,178
METHOD AND APPARATUS FOR TREATMENT OF SUSPENSIONS
Filed May 10, 1930   2 Sheets-Sheet 1
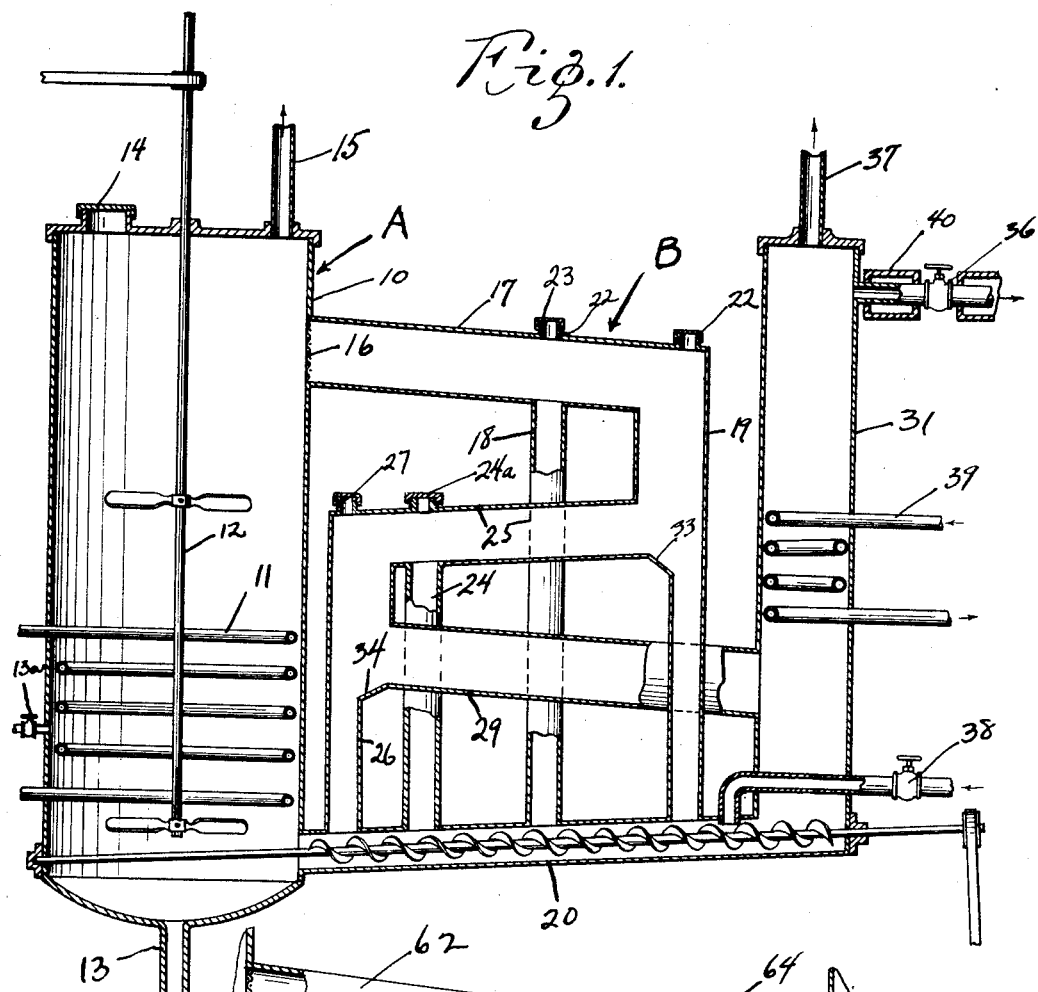
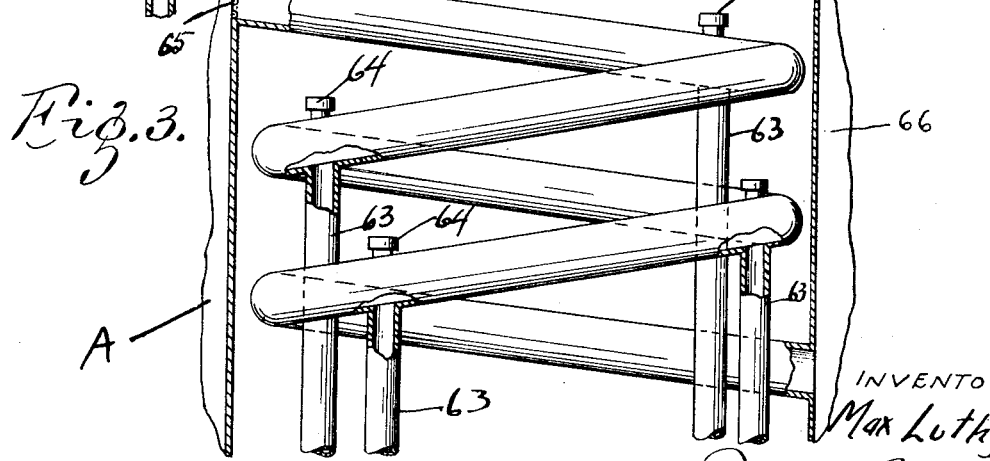
INVENTOR:
Max Luthy
BY Joseph R Marco
ATTORNEY.

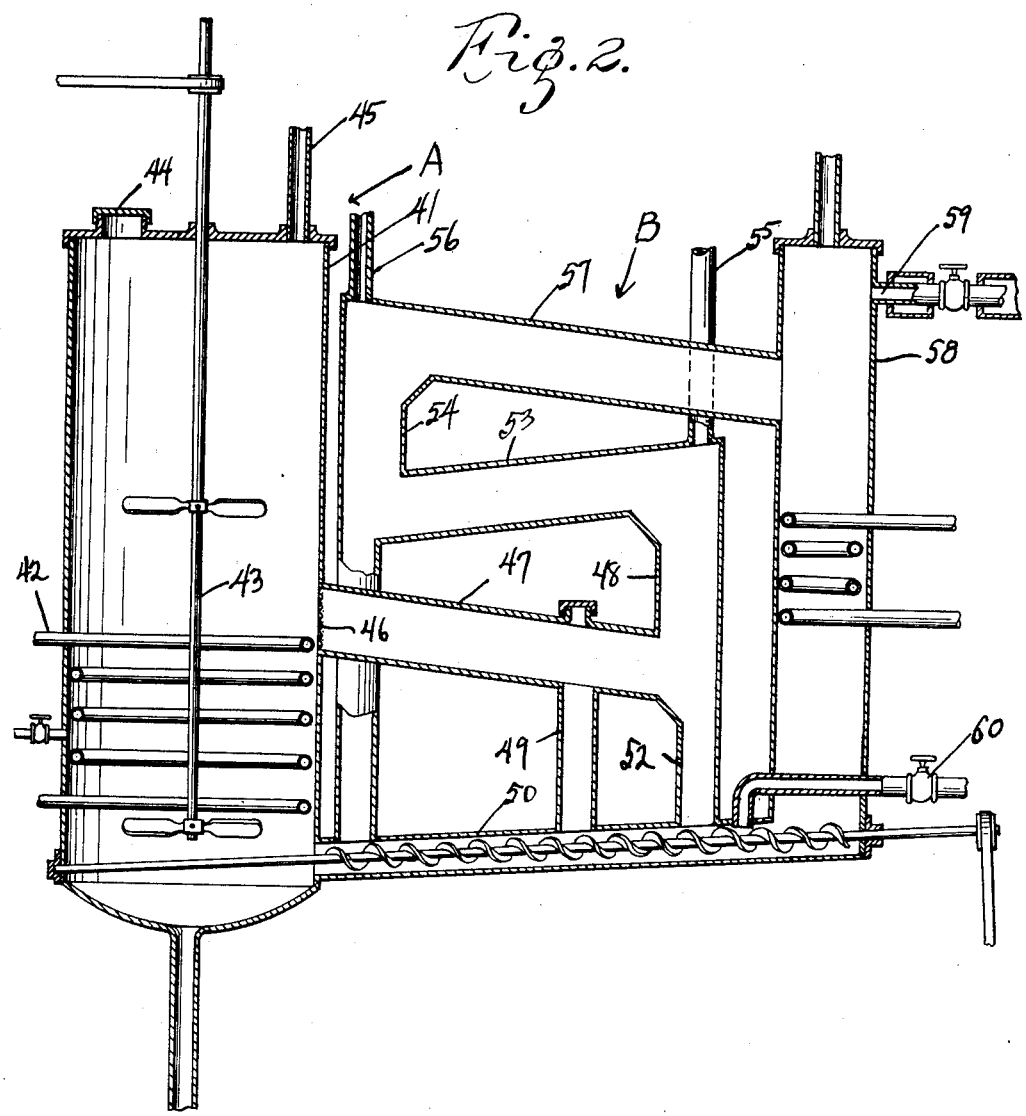

Patented Dec. 12, 1933

1,939,178

UNITED STATES PATENT OFFICE 1,939,178

METHOD AND APPARATUS FOR TREATMENT OF SUSPENSIONS

Max Luthy, St. Louis, Mo., assignor, by mesne assignments, to Monsanto Chemical Company, a corporation of Delaware Application May 10, 1930. Serial No. 451,303

7 Claims. (Cl. 210—51)

This invention relates to the processing of organic compositions by means of a reagent or solvent whereby valuable soluble matter may be extracted therefrom and it has particular application to the manipulation and processing of suspensions which cannot be filtered economically and which do not settle rapidly.

Many well known processes involve the extraction of valuable constituents from organic materials by means of a solvent. One example of such a process is to be found in the extraction of cocoa butter and alkaloids from cocoa waste. In general these processes involve thoroughly mixing the solvent and the solid matter, preferably at temperatures approaching the boiling point of the solvent, after which the solid matter is separated from the liquid preferably without substantially lowering of temperature. The separation usually involves a preliminary settling operation that is conducted in a suitable vat wherein the solid matter concentrates in the lower portion and a relatively clear solution remains above. The solid matter may be withdrawn continuously from the base of the container and the relatively clear liquid withdrawn from the top thereof. Satisfactory results are thus obtained, however, the settling operation is relatively slow, requiring large volumes of solvent which might otherwise be unnecessary. In processes involving the use of valuable solvents this feature of prior practice is particularly objectionable. Moreover extensive equipment is necessary to handle the large quantities of solvent undergoing treatment. It is not uncommon for a separator to account for three to five times the extractor volume. In addition to these disadvantages the separating equipment is necessarily of large dimensions consuming a substantial floor area.

One object of this invention is to provide a method of extraction or analogous treatment whereby the usual separator or thickener, employed for the purpose of facilitating the separation of the solid matter from the liquid is rendered unnecessary. As an ancillary object the invention is calculated to provide a rapid, simple method of concentrating a suspension of solids.

As an additional object, this invention contemplates a method of treating solid matter with a solvent and subsequently separating the solvent from the solid matter wherein the usual filtering operations are reduced very substantially and a large proportion of the total material being treated is at all times undergoing active extraction.

These together with other objects will become more apparent from a careful consideration of the drawings and accompanying description hereinafter set forth.

Figure 1 of the drawings is a diagrammatic elevational view, partly in section, of one form of apparatus which the present invention may take;

Figure 2 is a diagrammatic elevational view, likewise partly in section, of another apparatus embodying the principles of this invention; and Figure 3 is a fragmentary elevational view of a modified separator useful in place of that illustrated in Figure 1 or Figure 2.

Both of the embodiments illustrated in Figures 1 and 2 consist of an extractor A wherein a suspension of the solid material is actively extracted and a separator or thickener B, wherein the suspension is concentrated and returned to the extractor and the substantially clear liquid withdrawn. Usually the liquid withdrawn will contain a small amount of suspended matter, which is separated preferably by filtration before the dissolved constituents are separated from the solvents. The amount of suspended matter contained in the effluent liquor varies with the nature of the solid being treated, the rate at which it is passed through the separator, the temperature of the liquid medium, as well as many other varying factors. Although the apparatus can be operated at such a low rate as to give a substantially clear effluent liquid it is more practical to operate at a more rapid rate and in case a perfectly clear solution is desired to filter the small amount of solid matter remaining in suspension.

Referring to Figure 1, the apparatus consists of a cylindrical vessel 10, which is equipped with suitable heating means such as a steam coil 11, or as an alternative a steam jacket, not shown and an agitating device 12 adapted to maintain a uniform suspension of the solids within the extractor. The base tapers to a discharge pipe 13 which is provided with a valve, not shown, through which the spent or exhausted solid, together with the liquid, is discharged at the end of each cycle of operation. The top of the vessel includes a manhole 14 through which the solid matter which is to be treated is introduced and a pipe 15, through which solvent vapors are conducted to a reflux condenser not shown.

The separator consists of a slightly inclined horizontal conduit 17, preferably an annular pipe, which is joined to the upper end of the extractor vessel. Two spaced downcomers 18 and 19 interconnect the lower side of the conduit 17 with a screw conveyer 20 which is disposed below. Directly opposite the upper extremity of each of the downcomers a tube 22 is formed integrally with the horizontal conduit which is provided with a fluid tight cap 23 and which serves as a manhole for the inspection and cleaning of the conduit and downcomer.

Intermediate the extremities of the downcomer 19 a second inclined horizontal conduit 25 is joined thereto which extends to a fourth downcomer 26. A third downcomer 24 interconnects the screw conveyer and the inclined conduit 25, and bears a position to conduit 25 analogous to that borne by downcomer 18 to conduit 17. The conduit 25 is equipped with a tube and cap combination 24a similar to tube 22 and cap 23, and for the same purpose. A similar tube and cap combination 27 is formed integrally with the upper portion of the second conduit and substantially coaxially of the fourth downcomer 26. The fourth downcomer 26 is joined by a third horizontal conduit 29 intermediate its extremities which slopes downwardly as in the case of conduit 17 and 25 and extends to a vertical pipe 31, with which it is in fluid communication. The portions of the downcomers 19 and 26 intermediate the horizontal conduits are preferably of a diameter substantially the same as that of the conduits in order that the rate of flow of fluid therethrough will not be changed abruptly. The diameter of the portion of the downcomers intermediate the screw conveyer and the duct may be made of a smaller cross-sectional diameter. In order that any solid matter which might otherwise accumulate on the horizontally projected portion of the horizontal duct 25 and 29 indicated by numerals 33 and 34 be avoided, that portion is sloped in order that said solid matter may be carried downwardly through the downcomer and back into the extractor by way of the screw conveyer.

The conveyer tube interconnecting the lower portion of the extractor with the vertical pipe 31, receives the concentrated suspension which flows downwardly through the downcomers and pipe 31 and returns the same to the extractor. The liquid which is discharged from the lowermost horizontal duct rises upwardly through the vertical pipe 31 and is withdrawn through a valve connection 36. Vapors or permanent gases exhaust upwardly into pipe 37 which connects with a reflux condenser, not shown. Liquid is supplied from a tap 38 at the base of the vertical pipe whereby it discharges immediately adjacent the screw conveyer at a rate approximately the same as that at which liquid is withdrawn from the valve connection 36 above. In order to maintain the desired temperature, one may interpose a steam coil 39 in the vertical pipe 31, or construct a steam jacket about the parts as at 40.

After the extraction has proceeded to a point where further processing is no longer economical it is convenient to employ the extractor as a decantor. For this purpose the operation of the agitator is interrupted and the solid matter is permitted to settle to the lower portion of the vessel, thereafter the clear liquid is withdrawn through a tap 13a provided for this purpose on the side of the vessel and the concentrated suspension discharged through the pipe 13.

The apparatus may be constructed of any suitable material. The composition will, of course, vary with the nature of the materials being handled. Thus, for example, where relatively inert organic solvents are employed as in the extraction of cocoa materials, iron or steel may be employed conveniently. On the other hand, when liquids of a more or less corrosive nature are being handled other materials known to withstand the corrosive action should be employed. One may observe the operation of the apparatus conveniently by incorporating sight glasses as integral elements of the apparatus. The efficacy of the various downcomers can be checked in this manner to advantage.

In Figure 2 there is disclosed an apparatus of similar design insofar as the extractor is concerned. The flow of the suspension through the separator is however distinct from that in Figure 1. Thus the extractor consists of a vertical cylindrical vessel 41 which is equipped with heating means, such as a steam coil 42, and an agitating device 43 adapted to maintain a uniform suspension of the solid in the extractor. The base is tapered so as to discharge the contents of the vessel conveniently. A manhole 44 and a reflux condenser connection 45 are provided in the top of the extractor, for the purpose analogous to that described in Figure 1. The suspension in the extractor is discharged through a screen 46 into a horizontally downwardly inclined conduit 47 which extends from the extractor vessel to a vertical riser 48. A downcomer 49 intermediate the vessel and the riser interconnects the base of the conduit 47 with a screw conveyer 50 which functions to return the concentrated suspension as well as to promote circulation of the fluid through the separating apparatus. A second downcomer 52, which is in fact an extension of the riser 48, likewise interconnects the screw conveyer with the conduit 47.

A second horizontal inclined conduit 53 interconnects the upper extremity of the riser 48 with the lower extremity of a second riser 54. A continuation of the second riser extends downwardly from the lower extremity thereof to the screw conveyer and functions to permit the withdrawal of the concentrated suspension formed in the course of the flow of the material through the second conduit. The upper extremities of both risers are provided with vent pipes 55 and 56 for the purpose of obviating entrapment of gases therein. A third horizontal inclined conduit 57 interconnects the upper extremity of the second riser with a vertical pipe 58 similar to pipe 31 in Figure 1. Some sedimentation takes place in the vertical pipe as in the case of vertical pipe 31. The solid matter settles to the base of pipe 58 from where it is conveyed back to the extractor. The substantially clear liquid rises to the top and is discharged or withdrawn through the valve connection 59 whereas fresh solvent is introduced into the screw conveyer immediately adjacent the base of the vertical pipe through a valved pipe connection at 60. The operation of this device is similar to the operation of that illustrated in Figure 1 which is hereinafter set forth.

In Figure 3 there is illustrated a modified settling conduit 62 which has certain advantages from a fabrication and operation standpoint. It consists of a conduit of a cross-sectional dimension similar to that of the horizontal conduits 17 and 47, wherein the fluid flows downwardly uniformly and at a substantially constant rate. At spaced intervals downcomers 63 are connected to the base of the settling conduit which extend downwardly to a screw conveyer, not shown in Figure 3, or any other device adapted to return the suspension to the extractor. An inspection tube and screw cap 64 are provided for each downcomer as in Figures 1 and 2. It is to be noted that in this arrangement there is no abrupt change in vertical direction of flow which therefore favors the settling. The conduit may be a true annular coil or may consist of a plurality of straight segments interconnected by return bends. It is likewise to be noted that the principles of the present invention would apply to a straight conduit without return bends, however, such a construction suffers the disadvantage of requiring a long conveying mechanism for returning the concentrated suspension to the extractor.

The inlet end of the conduit 62 is provided with a screen 65 and is in fluid communication with the extraction vessel. The discharge end of the conduit is secured to a vertical pipe 66 such as 31 in Figure 1, or, in the event no further settling is desired, may discharge directly to a withdrawing pipe such as 36 in Figure 1.

To avoid heat losses as well as eddy or convection current disturbances resulting therefrom, the settling conduits may be lagged advantageously particularly when the operating temperature is relatively high.

In operating the devices of the present invention the solid material to be treated is introduced into the extractor through the manhole 14 and sufficient solvent introduced through the tap 38 to fill the apparatus. A uniform suspension of the solid in the extractor vessel is obtained with the aid of the agitating mechanism 12. Inasmuch as the horizontal conduits and downcomers, as well as the vertical pipe 31 have previously been filled with solvent that contains no suspended matter such solvent is displaced conveniently with the suspension either by the normal operation of the screw conveyer or by withdrawing liquid through the discharge valve 36 while adding an equal volume thereto through the inlet valve 38.

The liquid in the extractor is generally maintained at or near its boiling temperature. Having established a uniform suspension and the desired temperature conditions, the suspension passes through a screen 16 and enters the top horizontal conduit 17. By reason of the operation of the agitator, as well as the evolution of solvent vapors, the liquid undergoes violent agitation in the vessel 10, however, as soon as it enters the conduit the solid material suspended therein begins to settle. Such solid material is dragged along by the normal flow of the liquid through the conduit until it reaches the first downcomer 18. The concentrated suspension which accumulates on the bottom of the duct flows downwardly through the duct into the screw conveyer 20. The lean suspension flows to the second downcomer 19 while further settling occurs. The additional concentrated suspension which is so formed tends to flow downwardly through the second downcomer 19 and discharges into the screw conveyer duct. To this end the extremity of the lower portion of the duct indicated by numeral 33 is sloped to facilitate the downward movement of any sediment or solid matter into the vertical duct.

The settling operation continues in an analogous manner in the second conduit 25 and the concentrated suspension so formed is discharged into the conveyor through the third and fourth downcomers although the major portion of the solid matter will have separated in the first and second ducts. Additional settling out of solids is effected in the third conduit. Upon being discharged into the vertical pipe the relatively lean suspension rises upwardly, being aided by the heating coil, the latter usually being dispensable whereas the relatively concentrated suspension will settle to the bottom and be returned to the extractor with the aid of the conveyer. During its return the concentrated suspension will be mixed with fresh solvent from tap 38 and will thereafter undergo further extraction.

After valuable constituents present in the solid matter have been completely extracted as evidenced by the composition of the solvent discharged through the connection 36 the solid matter, as well as solvent in the apparatus, is discharged through the bottom of the extractor into a decanter or settling chamber, after which a new charge of solid is introduced and the cycle repeated. If desired, however, the extractor may itself be used as a decanter, in which case the rotation of the agitator is interrupted, after which the solid matter is permitted to settle and the clear solvent withdrawn through the valve 13a. Subsequently the concentrated suspension is discharged through pipe 13.

The rate of the settling in the conduit, as well as the rate at which the liquid can be permitted to flow through the settling conduit varies with the nature of the solvent and the solid being treated, the temperature of the solvent, the extent of the separation desired and many other factors. An idea of the efficacy of my invention can be gained from results which have been obtained with the apparatus illustrated in Figure 2, in the extraction of cocoa press cake, using ethylene dichloride as a solvent and in general following the procedure set forth in my co-pending application #213,198, filed August 15, 1927. Thus whereas according to present day practice a separator or thickener having a capacity of between two and three times that of the extractor would be necessary to obtain a separation of 98% of cocoa pulp from a 7% solid suspension thereof in ethylene dichloride, by means of the present invention the amount of solvent undergoing separation amounts to only 15–20% of the solvent present in the extractor. The 2% remaining solid matter can be separated from the solvent by filtration without difficulty. Moreover the nature of the apparatus itself is relatively simple in design and operation. The operation thereof is continuous and permits of the use of relatively volatile and expensive solvents without large investment charges which would otherwise be incurred.

While I have illustrated several embodiments of the present invention and have indicated the manner of operating the same it will be apparent to those skilled in the art that the present invention is not limited to the precise structures illustrated but may be subjected to many modifications without departing from the spirit thereof. It will likewise be apparent that the fundamental concept of conducting a suspension of material through a conduit having a substantial horizontal component whereby a relatively concentrated suspension is separated without interrupting the flow of the remaining relatively lean suspension may be applied in many forms and to many varied suspensions.

What I claim is:

1. In the processing of materials wherein comminuted solids are suspended in a fluid for treatment the steps in the continuous separation of the liquid from the solids which comprises causing the suspension to flow continuously through a duct wherein the solids are permitted to settle to the lower portion of said duct, withdrawing the suspension in the lower portion of the said duct containing the greater proportion of solids while maintaining the flow of the suspension through the duct.

2. In the processing of materials wherein solids are suspended in a fluid for treatment the steps in the continuous separation of the liquid from the partially treated solids which comprises causing the suspension to flow continuously through a duct wherein the solids are permitted to settle to the lower portion of said duct, withdrawing the suspension in the lower portion of the said duct containing the greater proportion of the said while maintaining the flow of the suspension through the duct and returning the suspension so withdrawn to the source thereof for repeated treatment.

3. In the processing of materials wherein comminuted solids are suspended in a fluid for treatment the steps in the continuous separation of the liquid from the solids which comprises causing the suspension to flow continuously through a duct wherein the solids are permitted to settle to the lower portion of said duct, withdrawing the relatively concentrated suspension formed in the lower portion of the said duct and returning the suspension so withdrawn to a source thereof while continuing the flow of the remaining liquid in the duct.

4. In the processing of materials wherein comminuted solids are suspended in a fluid for treatment the steps in the continuous separation of the liquid from the solids which comprises causing the suspension to flow continuously through a duct wherein the solids are permitted to settle to the lower portion of said duct, withdrawing the suspension in the lower portion of the said duct containing the greater proportion of solids while maintaining the flow of the suspension through the duct, returning the suspension so withdrawn to a source thereof while continuing the flow of the remaining liquid in the duct and replenishing the liquid withdrawn from the system.

5. The method of separating solid matter from a liquid suspension thereof which comprises causing the suspension to flow through a substantially horizontal duct resulting in a relatively concentrated suspension in the lower portion of the duct and a relatively lean suspension in the upper portion thereof, withdrawing said concentrated suspension from the lower portion of the duct without interrupting the flow of the relatively lean suspension, returning the suspension so withdrawn to the source of supply thereof, filtering the lean suspension and replenishing the liquid so withdrawn for filtration.

6. In the liquid treatment of a vegetable matter the method of separating a solid from a liquid suspension thereof which comprises causing the suspension to flow continuously through a duct whereby the solid matter tends to settle to the lower portion of said duct forming a relatively concentrated suspension of solid matter in the lower portion thereof and a relatively lean suspension of solid matter in the upper portion, withdrawing the relatively concentrated suspension and returning the same for further treatment while maintaining the flow of the suspension through the duct, continuing the separation of the solid from the relatively lean suspension and finally separating the last traces of solid matter from the liquid by filtration.

7. In the solvent treatment of a solid vegetable matter wherein the solid matter is mixed with a liquid solvent for the purpose of extracting soluble constituents in said solid matter, the method of separating the solvent rich in soluble constituents which comprises causing the treated suspension to flow continuously through a duct wherein the solid matter tends to settle forming a relatively concentrated suspension in the lower portion and a relatively lean suspension in the upper portion of the duct, withdrawing the concentrated suspension from the lower portion of the duct and returning the same for further treatment while continuing the flow of the lean suspension whereby further settling of the solid matter ensues, separating additional concentrated suspension which forms along the lower portion of the duct while continuing the flow of the lean suspension and finally separating the remaining solid matter from the resulting lean suspension by filtration.

MAX LUTHY.